US008800201B2

(12) United States Patent
Vickery (10) Patent No.: US 8,800,201 B2
(45) Date of Patent: Aug. 12, 2014

(54) TAMPER RESISTANT WEIGHTED RODENT AND INSECT BAIT STATION (75) Inventor: Ethan Vickery, Mansfield, TX (US)

(73) Assignee: VM Products, Inc., Bedford, TX (US)

( * ) Notice: Subject to any disclaimer, the term of this patent is extended or adjusted under 35 U.S.C. 154(b) by 0 days.

(21) Appl. No.: 12/816,300

(22) Filed: Jun. 15, 2010

(65) Prior Publication Data

US 2011/0219666 A1  Sep. 15, 2011

Related U.S. Application Data (63) Continuation of application No. 10/550,378, filed as application No. PCT/US2004/008692 on Mar. 19, 2004, now Pat. No. 7,735,258.

(60) Provisional application No. 60/456,807, filed on Mar. 22, 2003.

(51) Int. Cl.
*A01M 25/00* (2006.01)

(52) U.S. Cl.
USPC .............................. 43/131; 248/910; 220/603

(58) Field of Classification Search
USPC ................. 43/131; 248/910; 220/603, 908
See application file for complete search history.

(56) References Cited

U.S. PATENT DOCUMENTS

| | | | | |
|---|---|---|---|---|
| 524,894 A | * | 8/1894 | Forsberg | 248/910 |
| 759,030 A | * | 5/1904 | Sheaffer | 43/131 |
| 1,186,178 A | | 6/1916 | French | 43/131 |
| RE14,782 E | * | 12/1919 | Hedrich et al. | 43/131 |
| 1,443,287 A | * | 1/1923 | Snyder et al. | 43/131 |
| 1,729,389 A | * | 9/1929 | Hughett | 43/131 |
| 2,569,833 A | * | 10/1951 | Simpson, Sr. | 43/100 |
| 2,683,326 A | | 7/1954 | Gardner et al. | 43/131 |
| 2,710,485 A | | 6/1955 | Starr | 43/131 |
| 2,736,127 A | * | 2/1956 | McCann | 43/131 |
| 2,750,707 A | * | 6/1956 | Ekstedt | 43/131 |
| 2,784,577 A | * | 3/1957 | Beaham | 248/910 |
| 2,837,861 A | * | 6/1958 | Graham, Sr. | 43/131 |
| 2,896,361 A | * | 7/1959 | Allen | 43/131 |
| 2,950,562 A | * | 8/1960 | Lothrop | 43/102 |
| 2,953,868 A | * | 9/1960 | Chambers | 43/131 |
| 3,271,894 A | * | 9/1966 | Manno et al. | 43/100 |
| 3,303,600 A | * | 2/1967 | Freeman | 43/131 |
| 3,318,039 A | * | 5/1967 | MacDonald et al. | 43/100 |
| 3,319,373 A | * | 5/1967 | Gale et al. | 43/100 |

(Continued)

FOREIGN PATENT DOCUMENTS

| | | |
|---|---|---|
| DE | 03140658 | 4/1983 |
| DE | 10207916 | 4/2003 |

(Continued)

OTHER PUBLICATIONS

"Protect a Mouse Bait Station Features," RTU Mouse Bait Stations, http://www.rodentcontrols.com/mouse-bait-stations-rtu.htm, published Jun. 2004.

(Continued)

*Primary Examiner* — Darren W Ark
(74) *Attorney, Agent, or Firm* — Fulbright & Jaworski LLP (57) ABSTRACT

The present invention provides a bait station and method for securing it using a receptacle for holding a weight to weight a bait enclosure and by stakes formed as a unitary part of the enclosure for securing the enclosure.

50 Claims, 9 Drawing Sheets (56) References Cited

U.S. PATENT DOCUMENTS

| | | | | |
|---|---|---|---|---|
| 3,343,744 A * | 9/1967 | Morell et al. | | 43/131 |
| 3,427,743 A * | 2/1969 | Brunner et al. | | 43/131 |
| 3,471,114 A * | 10/1969 | Ball | | 248/910 |
| 3,488,879 A * | 1/1970 | Laughlin | | 43/131 |
| 3,704,539 A * | 12/1972 | Alvarez | | 43/131 |
| 3,708,905 A * | 1/1973 | Jalbert | | 43/100 |
| 3,750,326 A | 8/1973 | Haubtmann | | 43/131 |
| 3,821,861 A * | 7/1974 | Jalbert | | 43/100 |
| 3,978,607 A * | 9/1976 | Piere | | 43/131 |
| 3,992,804 A * | 11/1976 | Senese | | 43/100 |
| 4,026,064 A | 5/1977 | Baker | | 43/131 |
| 4,182,070 A * | 1/1980 | Connelly | | 43/131 |
| 4,208,829 A * | 6/1980 | Manning | | 43/131 |
| 4,226,042 A * | 10/1980 | Gilbert | | 43/96 |
| 4,277,907 A * | 7/1981 | Ernest | | 43/131 |
| 4,328,637 A | 5/1982 | Eichmuller et al. | | 43/131 |
| 4,398,643 A * | 8/1983 | Conlon | | 248/910 |
| 4,400,904 A | 8/1983 | Baker | | 43/131 |
| 4,407,427 A * | 10/1983 | Reuter | | 220/908 |
| D271,231 S | 11/1983 | Stout | | D22/122 |
| 4,418,493 A | 12/1983 | Jordan | | 43/67 |
| 4,438,606 A * | 3/1984 | Chardon et al. | | 248/910 |
| 4,453,337 A | 6/1984 | Williams | | 43/131 |
| 4,485,582 A | 12/1984 | Morris | | 43/131 |
| 4,486,973 A * | 12/1984 | Faucillon | | 43/100 |
| 4,521,987 A | 6/1985 | Knote | | 43/131 |
| 4,526,367 A * | 7/1985 | Haston et al. | | 473/483 |
| 4,541,198 A * | 9/1985 | Sherman | | 43/131 |
| 4,570,377 A * | 2/1986 | Primavera | | 43/131 |
| 4,637,162 A | 1/1987 | Sherman | | 43/131 |
| 4,648,201 A | 3/1987 | Sherman | | 43/131 |
| 4,660,320 A | 4/1987 | Baker et al. | | 43/131 |
| 4,730,411 A * | 3/1988 | Katis | | 43/105 |
| 4,730,412 A | 3/1988 | Sherman | | 43/131 |
| 4,753,032 A | 6/1988 | Sherman | | 43/131 |
| 4,765,579 A * | 8/1988 | Robbins et al. | | 220/908 |
| 4,833,819 A | 5/1989 | Sherman | | 43/131 |
| 4,835,902 A | 6/1989 | Sherman | | 43/131 |
| 4,872,582 A * | 10/1989 | Sipple | | 220/908 |
| 4,874,103 A * | 10/1989 | Quisenberry et al. | | 220/908 |
| 4,905,407 A | 3/1990 | Sherman | | 43/131 |
| 5,004,114 A * | 4/1991 | Terbrusch et al. | | 220/908 |
| 5,014,943 A * | 5/1991 | Nelson et al. | | 248/99 |
| 5,038,516 A | 8/1991 | Doucette | | 43/131 |
| 5,040,327 A | 8/1991 | Stack et al. | | 43/131 |
| 5,105,972 A * | 4/1992 | Waterston et al. | | 220/908 |
| 5,131,184 A * | 7/1992 | Harrison | | 43/100 |
| 5,136,803 A | 8/1992 | Sykes et al. | | 43/131 |
| 5,150,810 A * | 9/1992 | Loebbert | | 220/908 |
| 5,152,420 A * | 10/1992 | Bird et al. | | 220/908 |
| 5,174,462 A * | 12/1992 | Hames | | 220/908 |
| 5,184,836 A * | 2/1993 | Andrews et al. | | 220/908 |
| 5,272,832 A * | 12/1993 | Marshall et al. | | 43/131 |
| 5,295,607 A * | 3/1994 | Chang | | 220/908 |
| 5,385,258 A * | 1/1995 | Sutherlin | | 220/908 |
| 5,405,041 A * | 4/1995 | Van Brackle | | 220/908 |
| 5,419,453 A * | 5/1995 | Lochridge | | 220/908 |
| 5,448,852 A * | 9/1995 | Spragins et al. | | 43/131 |
| 5,458,259 A * | 10/1995 | Falk | | 220/908 |
| 5,503,292 A * | 4/1996 | Cuccharia | | 220/908 |
| 5,513,465 A | 5/1996 | Demarest et al. | | 43/113 |
| 5,549,214 A * | 8/1996 | Harris | | 220/908 |
| D374,704 S | 10/1996 | Rimback | | D22/122 |
| 5,806,237 A | 9/1998 | Nelson et al. | | 43/131 |
| 5,839,220 A * | 11/1998 | Wass | | 43/100 |
| 5,848,692 A * | 12/1998 | Thorne et al. | | 220/908 |
| 5,870,853 A | 2/1999 | Williams | | 43/131 |
| 5,897,018 A * | 4/1999 | Pruitt | | 220/908 |
| 5,918,410 A | 7/1999 | Knuppel | | 43/131 |
| 5,943,814 A * | 8/1999 | Bartlett, Jr. | | 43/104 |
| 5,953,854 A | 9/1999 | Hyatt | | 43/131 |
| 5,966,863 A | 10/1999 | Payton et al. | | 43/131 |
| 5,987,811 A * | 11/1999 | Wiesener et al. | | 43/131 |
| 6,058,646 A * | 5/2000 | Bishoff et al. | | 43/131 |
| 6,082,042 A | 7/2000 | Issitt | | 43/131 |
| 6,155,002 A | 12/2000 | Holder | | 43/115 |
| 6,158,166 A | 12/2000 | Snell et al. | | 43/131 |
| 6,234,339 B1 * | 5/2001 | Thomas | | 220/908.1 |
| 6,247,592 B1 * | 6/2001 | Racicot et al. | | 220/908 |
| 6,267,079 B1 * | 7/2001 | Eby | | 43/100 |
| 6,343,434 B1 | 2/2002 | Petti | | 43/131 |
| 6,397,517 B1 * | 6/2002 | Leyerle et al. | | 43/131 |
| 6,446,930 B1 * | 9/2002 | Li | | 248/910 |
| 6,470,622 B1 | 10/2002 | Braun | | 43/131 |
| 6,474,016 B2 | 11/2002 | Snell et al. | | 43/131 |
| 6,508,337 B1 | 1/2003 | Esper | | 188/71.5 |
| 6,508,377 B1 * | 1/2003 | Griswold et al. | | 220/908 |
| 6,513,283 B1 * | 2/2003 | Crossen | | 43/131 |
| 6,530,496 B2 | 3/2003 | Moran | | 220/603 |
| 6,594,948 B1 | 7/2003 | Novack | | 43/131 |
| 6,618,983 B1 | 9/2003 | Spragins | | 43/107 |
| 6,637,717 B2 * | 10/2003 | Li | | 248/519 |
| 6,644,493 B1 * | 11/2003 | Walton et al. | | 220/908 |
| 6,671,999 B1 * | 1/2004 | Doucette | | 43/131 |
| 6,672,000 B2 * | 1/2004 | Aesch, Jr. | | 43/131 |
| D486,203 S | 2/2004 | Stephen | | D22/122 |
| 6,718,687 B2 | 4/2004 | Robison | | 43/114 |
| 6,722,080 B2 | 4/2004 | Carter | | 43/107 |
| 6,789,351 B2 | 9/2004 | Chrestman | | 43/122 |
| 6,792,713 B2 | 9/2004 | Snell | | 43/124 |
| 6,807,768 B2 * | 10/2004 | Johnson et al. | | 43/131 |
| D498,286 S | 11/2004 | Loerakker et al. | | D22/122 |
| 6,860,062 B2 | 3/2005 | Spragins | | 43/121 |
| 6,874,274 B2 * | 4/2005 | Townsend | | 43/131 |
| 6,901,694 B1 * | 6/2005 | Neault et al. | | 43/131 |
| 6,910,300 B1 | 6/2005 | Warren | | 43/131 |
| 6,981,680 B1 * | 1/2006 | Gordon et al. | | 248/910 |
| 7,165,353 B2 | 1/2007 | Matts et al. | | 43/131 |
| 7,165,354 B1 * | 1/2007 | Rickenbacker | | 43/131 |
| 7,213,869 B1 * | 5/2007 | McClellan | | 248/910 |
| 7,513,476 B1 * | 4/2009 | Huang | | 248/910 |
| 7,647,723 B2 * | 1/2010 | Klein et al. | | 43/131 |
| 7,735,258 B2 | 6/2010 | Vickery | | 43/131 |
| 7,874,098 B2 * | 1/2011 | Vickery et al. | | 43/131 |
| 8,028,468 B1 * | 10/2011 | Walsh et al. | | 43/131 |
| 8,209,900 B2 * | 7/2012 | Vickery et al. | | 43/131 |
| 8,516,740 B2 * | 8/2013 | Vickery et al. | | 43/131 |
| 8,578,649 B1 * | 11/2013 | Walsh et al. | | 43/131 |
| 2001/0040208 A1 * | 11/2001 | Li | | 248/519 |
| 2002/0043018 A1 | 4/2002 | Townsend | | 43/131 |
| 2003/0038141 A1 * | 2/2003 | Landsberger | | 220/603 |
| 2003/0116569 A1 * | 6/2003 | Mercier | | 220/908 |
| 2004/0094558 A1 * | 5/2004 | Najd | | 220/603 |
| 2004/0195250 A1 * | 10/2004 | Fripps | | 220/603 |
| 2005/0017148 A1 * | 1/2005 | Tung | | 248/910 |
| 2005/0028431 A1 * | 2/2005 | Hoyes et al. | | 43/131 |
| 2005/0097808 A1 | 5/2005 | Vorhies et al. | | 43/61 |
| 2005/0102887 A1 * | 5/2005 | Lang et al. | | 43/64 |
| 2005/0132637 A1 | 6/2005 | Deakins | | 43/131 |
| 2008/0072475 A1 | 3/2008 | Nelson et al. | | 43/131 |
| 2009/0056199 A1 * | 3/2009 | Reed | | 43/131 |
| 2009/0307963 A1 * | 12/2009 | Abbas | | 43/131 |
| 2010/0031557 A1 | 2/2010 | Vickery et al. | | 43/131 |
| 2010/0170141 A1 | 7/2010 | Cink et al. | | 43/65 |
| 2010/0251598 A1 | 10/2010 | Vickery | | 43/58 |
| 2011/0072709 A1 * | 3/2011 | Patterson et al. | | 43/131 |
| 2011/0179694 A1 * | 7/2011 | Vickery et al. | | 43/131 |
| 2011/0226921 A1 * | 9/2011 | Patterson | | 43/1 |
| 2013/0118056 A1 * | 5/2013 | Covington | | 43/131 |

FOREIGN PATENT DOCUMENTS

| | | | | |
|---|---|---|---|---|
| EP | 442190 | | 1/1994 | |
| EP | 0599755 | | 6/1994 | |
| EP | 1234502 | | 2/2002 | |
| EP | 1201124 | | 5/2002 | |
| FR | 2268464 | | 11/1975 | |
| FR | 2268464 A * | | 12/1975 | A01K 69/10 |
| FR | 2331281 | | 6/1977 | |
| FR | 2331281 A * | | 7/1977 | A01K 69/08 |
| FR | 2398454 | | 2/1979 | |
| FR | 2398454 A * | | 3/1979 | A01K 69/08 |
| FR | 2855720 | | 12/2004 | |
| GB | 2 249 249 | | 5/1992 | |

(56) References Cited

FOREIGN PATENT DOCUMENTS

| | | | | |
|---|---|---|---|---|
| GB | 2249249 A * | 5/1992 | ............ | A01M 25/00 |
| GB | 2 269 306 | 2/1994 | | |
| GB | 2269306 A * | 2/1994 | .............. | A01M 3/00 |
| WO | WO 02/13604 | 2/2002 | | |
| WO | WO 02/013604 A1 * | 2/2002 | ............ | A01M 23/08 |
| WO | WO 03/009683 | 2/2003 | | |
| WO | WO 3009683 A1 * | 2/2003 | ............ | A01M 23/16 |
| WO | WO 2005/006857 | 1/2005 | | |
| WO | WO 2005006857 A2 * | 1/2005 | ............ | A01M 25/00 |

OTHER PUBLICATIONS

Notice to Manufacturers, Formulators Registrants and Users of Pesticides, United States Environmental Protection Agency, Washington D.C., Sep. 16, 1994.
Office Action issued in U.S. Appl. No. 10/550,378 dated Aug. 21, 2007.
Response to Office Action issued in U.S. Appl. No. 10/550,378 dated Oct. 25, 2007.
Office Action issued in U.S. Appl. No. 10/550,378 dated Dec. 28, 2007.
Response to Office Action issued in U.S. Appl. No. 10/550,378 dated Jun. 27, 2008.
Office Action issued in U.S. Appl. No. 10/550,378 dated Sep. 19, 2008.
Response to Office Action in U.S. Appl. No. 10/550,378, dated Dec. 9, 2008.
Office Action issued in U.S. Appl. No. 10/550,378 dated Feb. 18, 2009.
Response to Office Action in U.S. Appl. No. 10/550,378, dated May 13, 2009.
Office Action issued in U.S. Appl. No. 10/550,378 dated Jul. 8, 2009.
Response to Office Action in U.S. Appl. No. 10/550,378, dated Aug. 26, 2009.
Office Action issued in U.S. Appl. No. 10/550,378 dated Nov. 12, 2009.
Response to Office Action in U.S. Appl. No. 10/550,378, dated Feb. 12, 2010.
Office Action issued in U.S. Appl. No. 12/816,315, dated Sep. 30, 2010.
Response to Office Action in U.S. Appl. No. 12/816,315, dated Mar. 30, 2011.
Office Action issued in U.S. Appl. No. 12/816,315, dated Jun. 15, 2011.
Office Action issued in U.S. Appl. No. 12/816,306, dated Sep. 30, 2010.
Response to Office Action in U.S. Appl. No. 12/816,306, dated Mar. 30, 2011.
Office Action issued in U.S. Appl. No. 12/816,306, dated Jun. 28, 2011.

* cited by examiner

TAMPER RESISTANT WEIGHTED RODENT AND INSECT BAIT STATION

CROSS-REFERENCES TO RELATED APPLICATION(S)

This is a continuation of U.S. application Ser. No. 10/550,378, now U.S. Pat. No. 7,735,258, filed Sep. 21, 2005, which is a national phase application under 35 U.S.C. §371 of International Application No. PCT/US2004/008692 filed Mar. 19, 2004, which claims priority to U.S. Provisional Application No. 60/456,807 filed Mar. 22, 2003, all of which are incorporated by reference without disclaimer.

TECHNICAL FIELD OF THE INVENTION

The present invention relates to the field of rodent and insect bait stations.

BACKGROUND OF THE INVENTION

Bait stations are used to house poisonous bait that kill rodents or insects. Typical rodent bait station configurations are described in U.S. Pat. Nos. 5,448,852 and 5,040,327. In summary, a typical rodent bait station comprises an enclosure containing poisonous bait. One or more doorways into the enclosure is provided for the rodent to enter and eat some of the bait. The poisonous bait causes the rodent to die after leaving the bait station. Partitions within the enclosure prevent harm to a child by forming angles around which a child cannot reach to touch the bait. A lid that can only be opened with a special tool is provided to replace the bait, thereby making the bait station tamper resistant. Insect bait stations are similar in operation.

A bait station must be secured to prevent it from easily being tipped over or moved. The conventional manner for securing a bait station is to bolt it to something heavy such as a concrete structure or patio block. For example, a long bolt can be inserted through the base of the bait station and through a hole in a patio block. Then a washer and nut is screwed onto a threaded end of the bolt to secure the bait station to the patio block. The weight of the patio block then holds the bait station in place. Such methods of securing a base station are inconvenient and what is needed is a more convenient method for securing a base station.

SUMMARY OF THE INVENTION

The present invention overcomes prior art limitations by providing an easy method to secure a bait station. According to one aspect of the invention, a bait station is provided with a receptacle in which a patio block or other heavy material can be inserted to weight the bait station. According to another aspect of the invention, for ease of manufacture, a separate unit to which the bait enclosure of the bait station can be connected forms the receptacle that holds the block, weight or heavy material. According to another aspect of the invention, an existing bait station can be adapted to be secured to the receptacle that holds the weight using an easily implemented adapting mechanism designed there for. According to yet another aspect of the invention a stake is provided to secure the bait station to the ground as an alternative to using a weighting structure.

The foregoing has outlined rather broadly aspects, features and technical advantages of the present invention in order that the detailed description of the invention that follows may be better understood. Additional aspects, features and advantages of the invention will be described hereinafter. It should be appreciated by those skilled in the art that the disclosure provided herein may be readily utilized as a basis for modifying or designing other structures for carrying out the same purposes of the present invention. Persons of skill in the art will realize that such equivalent constructions do not depart from the spirit and scope of the invention as set forth in the appended claims, and that not all objects attainable by the present invention need be attained in each and every embodiment that falls within the scope of the appended claims.

BRIEF DESCRIPTION OF THE DRAWINGS

For a more complete understanding of the present intention, and the advantages thereof, reference is now made to the following descriptions taken in conjunction with the accompanying drawings, in which.

DETAILED DESCRIPTION OF THE PREFERRED EMBODIMENTS

Figure 1:
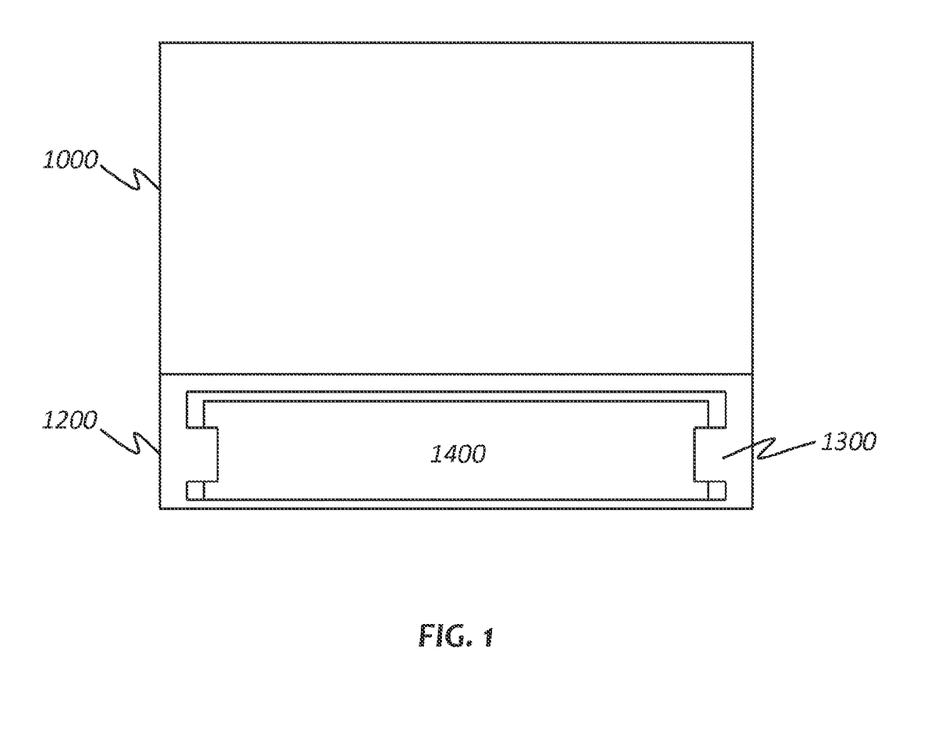
FIG. 1 is a drawing of an embodiment of the invention.

A preferred embodiment of the present invention is shown in FIG. 1. A conventional enclosure 1000 for a bait station is molded from a suitable plastic material as a unit with a receptacle 1200. Receptacle 1200 is dimensioned to receive a weighting structure 1400, such as an ordinary commercially available patio block that can slide into the receptacle 1200. In this way, no special securing apparatus, such as a nut, bolt, and washer assembly, is required to secure the bait station to the patio block or other weighting structure. Moreover, the patio block can be removed from the bait station by simply removing it from the receptacle 1200, without the necessity of disassembling a separate securing mechanism such as the aforementioned bolt assembly. Further, one or more lip mechanisms 1300 can be provided to secure the weight in place within receptacle 1200. Alternative methods may be employed to secure the weight in place within the receptacle such as described with reference to FIG. 7.

Figure 2:
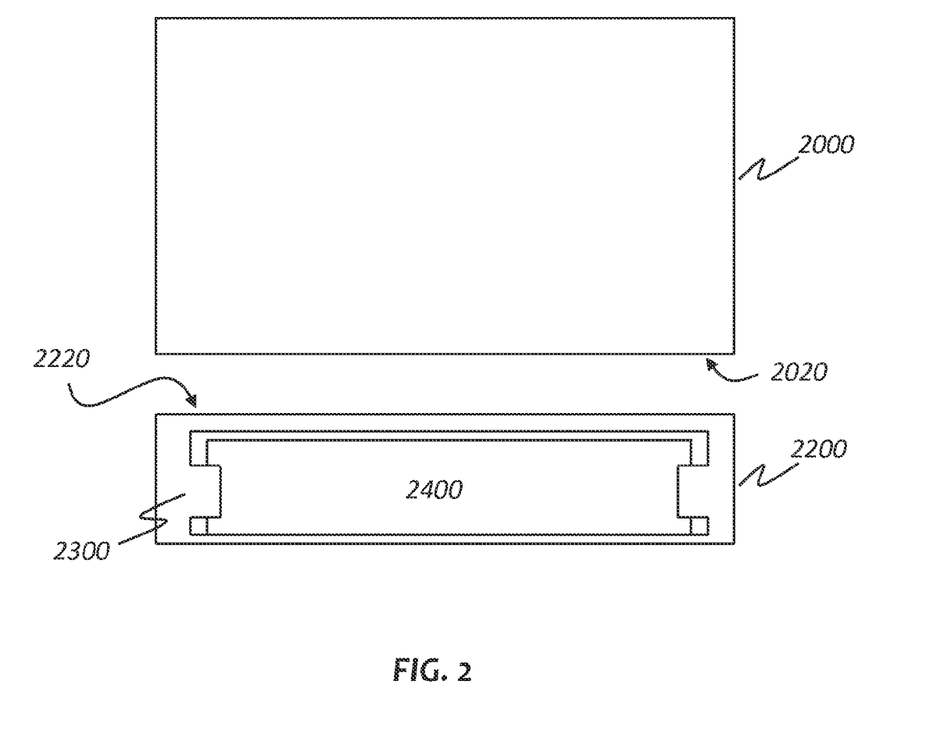
FIG. 2 is a drawing of an embodiment of the invention.

Another preferred embodiment of the invention is shown in FIG. 2. A conventional bait station 2000 is molded separately from a receptacle 2200 for ease and lower cost of manufacture. Bait station 2000 may then be permanently or removably connected to receptacle 2200. As described abode with reference to FIG. 1, receptacle 2200 is designed to hold a weighting structure such as a patio block 2400, which can be secured in place with lip mechanisms 2300, or functionally comparable mechanism.

As an alternative, or in addition to, the lip mechanisms 1300, 2300 shown in FIG. 1 or 2, an end cap that covers and encloses the open end of receptacle 1200, 2200 may be employed to secure the weighting material therein. This facilitates enclosing the weighting material within a cavity formed by receptacle 2200, enabling insertion and enclosure of a patio block, rock, gravel, sand, concrete, or other material of sufficient density to weight the bait station.

Figure 3:
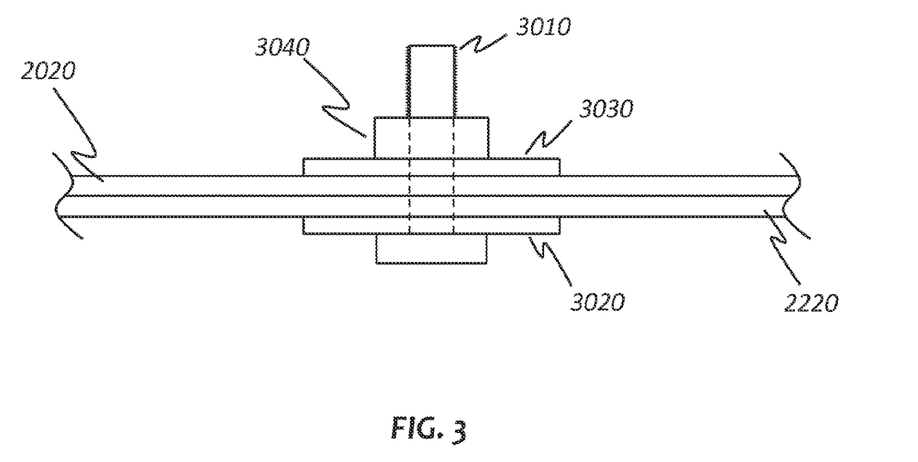
FIG. 3 is a drawing of a connecting assembly.

One method for securing bait station 2000 to receptacle 2200 is to use an adhesive cement to bond the base 2020 of bait station 2000 to an upper surface 2220 of receptacle 2200. A method for removably securing bait station 2000 to receptacle 2200 is to provide one or more nut and bolt assemblies, as shown in FIG. 3. A bolt 3010 is inserted upward through a washer 3020 and through upper surface 2220 of receptacle 2200, through a second washer 3030 and through base 2020 of bait station 2000, and is secured with a nut 3040. A plurality of nut and bolt assemblies so installed and distributed over the area of base 2020 may be provided for greater strength and durability. Clearly, the bolts can also or alternatively be inserted downward through the base through the upper surface of the receptacle.

Figure 4:
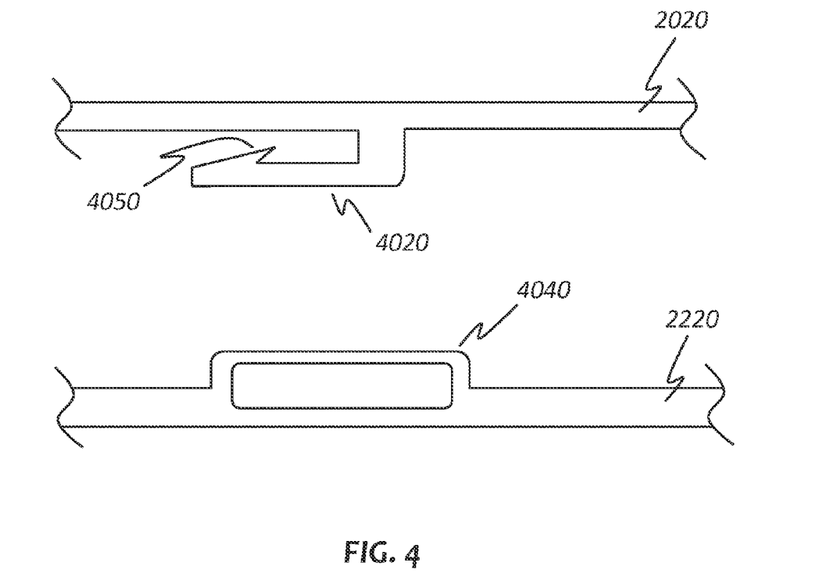
FIG. 4 is a drawing of a connecting mechanism.

An alternative method for securing bait station 2000 to receptacle 2200 is by providing a tongue and groove mechanism as shown in FIG. 4. On the underside of the base 2020 of bait station 2000 is a tongue 4020. Tongue 4020 is dimensioned and positioned to mate with a groove 4040—shown, for clarity, at right angles to the direction of tongue 4020—formed in upper surface 2220 of receptacle 220. When tongue 4020 is inserted through groove 4040 a lip 4050 of tongue 4020 causes the bait station 2000 to be secured to receptacle 2200. A plurality of tongue and groove mechanisms so installed and distributed over the area of base 2020 may be provided for greater strength and durability. Clearly, the grooves may also or alternatively be formed in the base of the enclosure to receive tongues formed to protrude from the upper surface of the receptacle.

Figure 5:
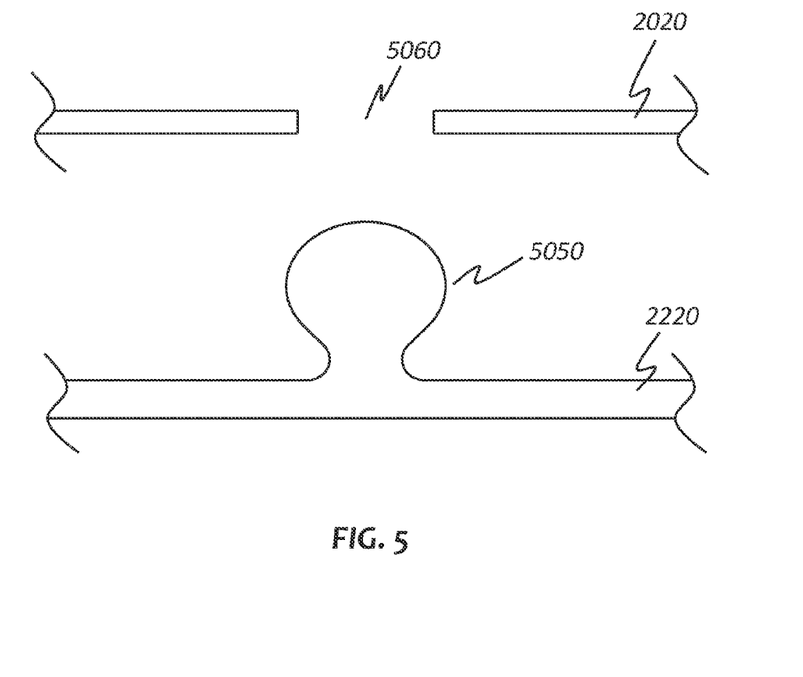
FIG. 5 is a drawing of a connecting mechanism.

Another embodiment for securing bait station 2000 to receptacle 2200 is to provide one or more protrusions 5050, as shown in FIG. 5. Protrusion 5050 extends upward from the upper surface 2220 of receptacle 2200, through a hole 5060 in the floor 2020 of bait enclosure 2000. A plurality of protrusions 5050 and mating holes 5060 for receiving the protrusions so formed and distributed over the area of base 2020 may be provided for greater strength and durability. Clearly, the protrusions may also or alternatively extend downward from the base of the enclosure and protrude into holes provided in the receptacle.

Figure 6:
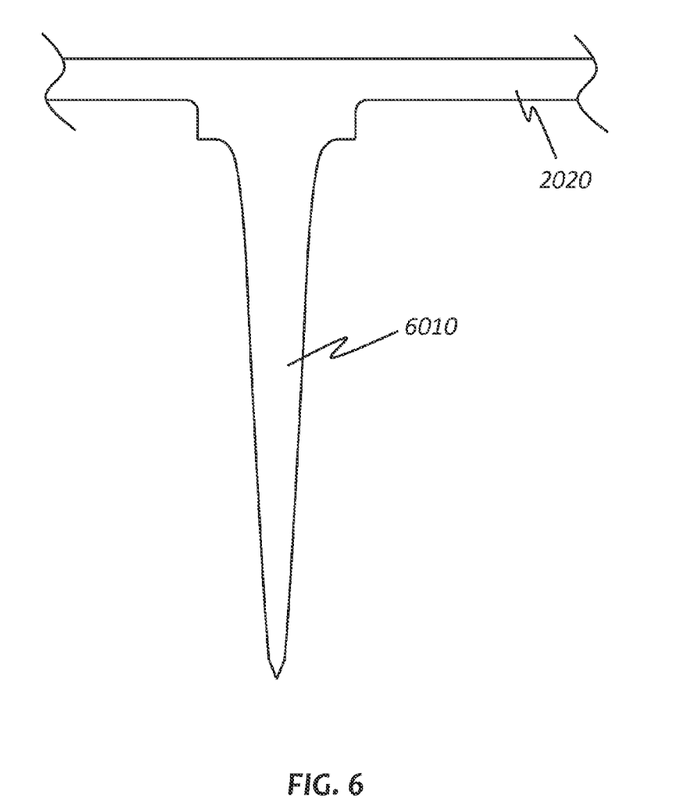
FIG. 6 is a drawing of a stake appendage mechanism.

Another embodiment of the invention is shown in FIG. 6, where an alternative to providing a receptacle for a weighting structure is provided. One or more stakes 6010 are formed as a part of a unitary whole with bait station enclosure 2000. Stakes 6010 are directed downward from the base 2020 of bait station 2000 into the earth, thereby securing the bait station in place. This may be preferable to use of a weighting structure in certain situations. A plurality of stakes 6010 distributed over the area of base 2020 may be provided for greater strength and durability. By forming the stakes as a unitary part of the bait enclosure, separate stakes need not be provided.

Figure 7:
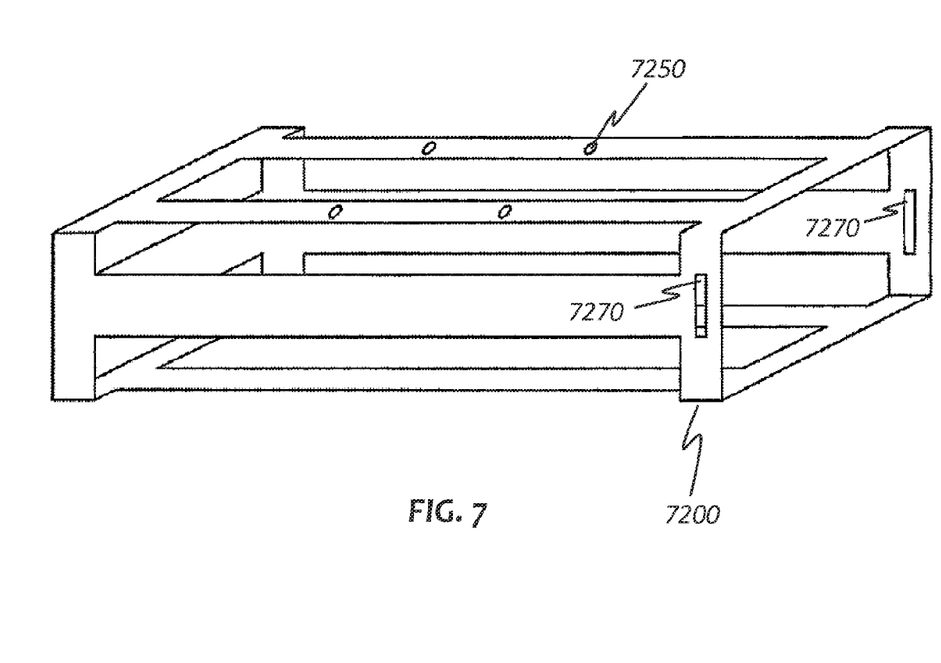
FIG. 7 is a drawing of a receptacle for holding a weighting object.

FIG. 7 shows an alternative configuration of a receptacle 7200 for holding a weighting structure such as a patio block for securing a bait enclosure. This configuration requires less material for manufacture. As an alternative to molding lip mechanisms, as shown in FIGS. 1 and 2, a locking bar may be inserted through slots 7270 to secure the weighting structure within receptacle 7200. Holes 7250 are shown for securing receptacle 7200 to a bait enclosure using methods described above with reference to FIGS. 2 through 6.

Figure 8:
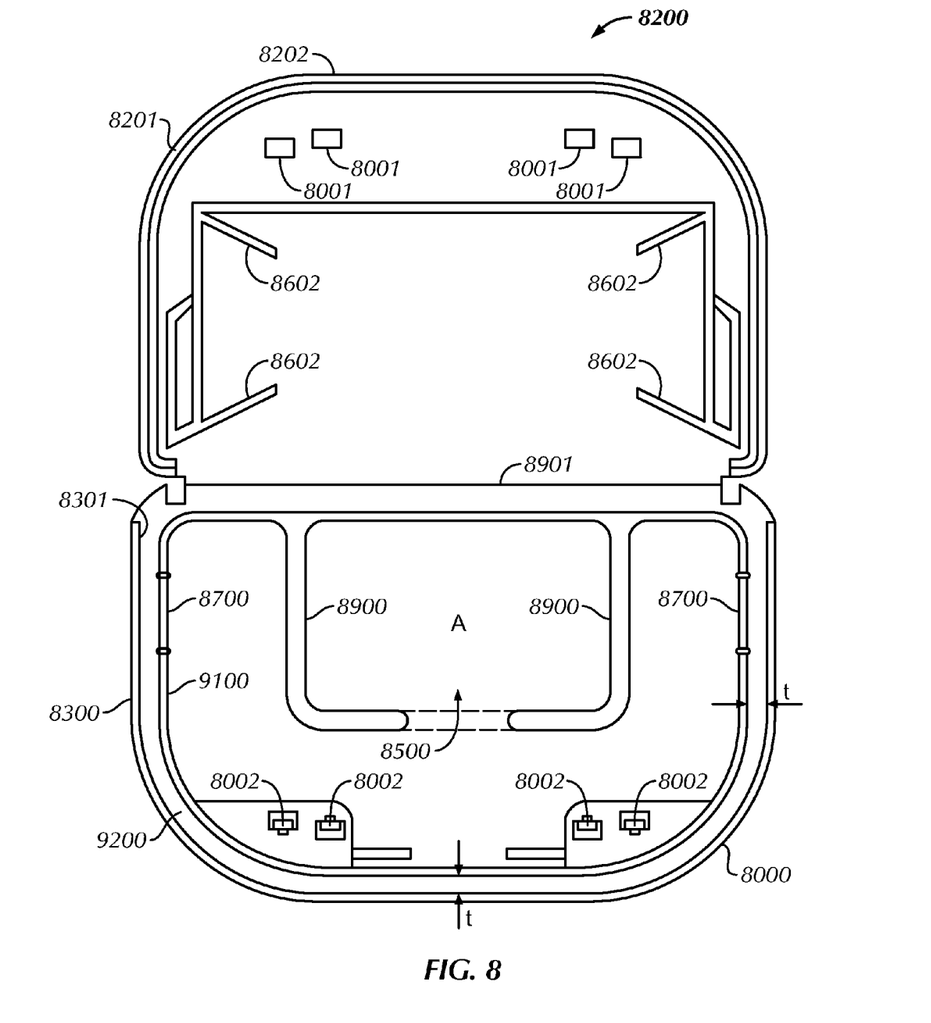
FIG. 8 is a top view drawing of a bait station of the present invention.

A top view of a preferred embodiment of the present invention is shown in FIG. 8. An enclosure 8000 for a bait station is preferably molded from a suitable plastic material as an integral unit. A lid 8200 shown in the open position in FIG. 8 is molded to the enclosure 8000, folding at line 8801 Formed in lid 8200 are two sets of locking retention elements 8001 which, when the lid is closed, interlock with corresponding sets of deflection elements 8002 integrally molded into the enclosure 8000.

Formed in bait station 8000 are two doors 8700, one in each sidewall of the station, to enable rodents and other pests, such as roaches, to enter and exit the enclosure. Interior to the enclosure is a bait chamber formed by walls 8900 that extend vertically from the bottom of enclosure 8000 up to the top of the enclosure flush with the surface of lid 8200 when lid 8200 is closed. A door 8500 to the bait chamber enables the rodent or pest to enter and access the poisonous bait placed in the bait chamber in region A.

Figure 9:
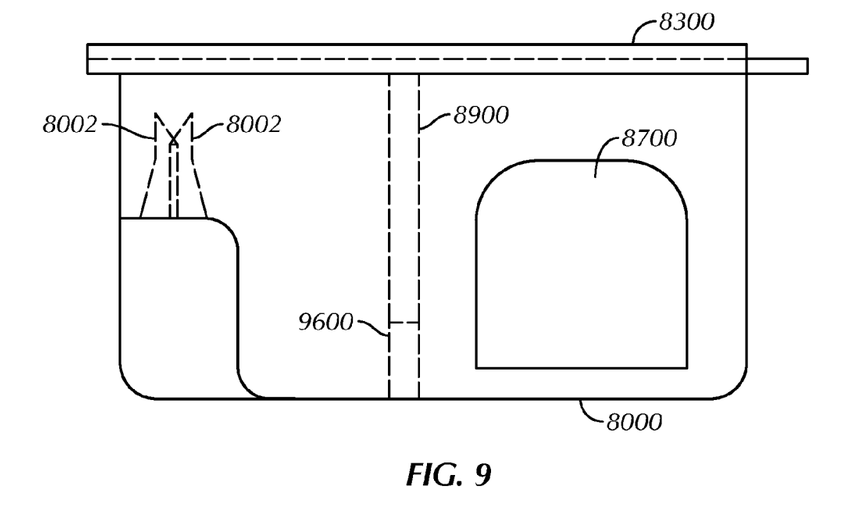
FIG. 9 is a side view drawing of a bait station of the present invention.

FIG. 9 is a side view of a preferred embodiment of the present invention, showing side door 8700 and interior wall 900. Note that the orientation and dimension of the enclosure doors 8700 and bait chamber door 8500 in wall 8900 is such that no child could insert his or her hand into the enclosure 8000 and reach the bait. Also note that the door 8500 exhibits a threshold 9600 that is raised slightly, about a half inch from the bottom of enclosure 8000, to prevent liquid from entering the bait chamber.

At the top of enclosure 8000 is an exterior lip 8300 that protrudes upward from a surface 9200 and extends around at least most of the outer periphery of the top of the enclosure. A second lip 9100 also protrudes upward from surface 9200 and extends around at least most of the periphery of the top of enclosure 8000, following a path a distance t from the edge of lip 8300. At the top of lid 8200 is also a lip 8201 extending around at least most of the periphery of lid 8200. When lid 8200 is closed to cover enclosure 8000, then lip 8201 fits between lips 8300 and 9100. More particularly, the outer most edge 8202 of lip 8201 fits snugly against or closely adjacent to the inner most edge 8301 of lip 8300. This prevents an attempt to pry open the lid by preventing a sharp or flat-edged object from being inserted between the top of the enclosure and the lid, thereby adding supplemental tamper resistance. Thus, a lip engaging mechanism is provided to further enhance the tamper-resistant functionality of the bait station of the present invention. Note that the engaging lips 8300 and 8201 should preferably extend around a substantial portion of the periphery of the top of the enclosure to substantially eliminate any region around the periphery where prying of the lid can occur.

Also shown in FIG. 8, integrally molded into lid 8200 are ridges 8602. These ridges add strength to the lid. Further, forced lateral shifting of the lid is substantially prevented because ridges 8602 when shifted laterally will contact and be blocked by walls 8900 from any substantial lateral shifting.

Although the present invention and its advantageous have been described in detail, it should be understood that various changes, substitutions and alterations can be made herein without departing from the spirit and scope of the invention as defined by the appended claims. The invention achieves multiple objectives and because the invention can be used in different applications for different purposes, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, for steps.

What is claimed is:

1. A bait station comprising:
   a lid coupled to a base, the base and lid defining an interior when the lid is closed, the base having a bottom, a doorway that leads to the interior, and a bait chamber defined at least in part by walls that extend vertically from the base; and
   an empty receptacle securable to the base such that a portion of the receptacle is underneath the bottom of the base of the bait station, the receptacle being sized to hold, and having an opening through which, weighted material as large as a patio block can be inserted into or removed from the receptacle without screwing or unscrewing a fastener, and such that when the weighted material is disposed in the receptacle a portion of the weighted material is underneath the bottom of the base of the bait station and no portion of the weighted material is below the receptacle; and
   wherein when the receptacle is on a surface with the weighted material disposed in the receptacle the portion of the receptacle is underneath the portion of the weighted material and above the surface.

2. The bait station of claim 1, wherein the lid is integrally hinged to the base.

3. The bait station of claim 1, wherein the base includes a second doorway that leads to the interior.

4. The bait station of claim 3, wherein the lid is integrally hinged to the base.

5. The bait station of claim 4, further comprising bait designed to kill rodents, the bait being positioned in the interior.

6. The bait station of claim 1, further comprising bait designed to kill rodents, the bait being positioned in the interior.

7. A bait station comprising:
   a lid coupled to a base, the base and lid defining an interior when the lid is closed, the base having a bottom and a doorway that leads to the interior, the base also having a height and a front-to-back width that is greater than the height;
   an empty receptacle securable to the base such that a portion of the receptacle is underneath the bottom of the base of the bait station, the receptacle being sized to hold, and having an opening through which, weighted material as large as a patio block can be inserted into or removed from the receptacle without screwing or unscrewing a fastener, and such that when the weighted material is disposed in the receptacle a portion of the weighted material is underneath the bottom of the base of the bait station and no portion of the weighted material is below the receptacle; and
   wherein when the receptacle is on a surface with the weighted material disposed in the receptacle the portion of the receptacle is underneath the portion of the weighted material and above the surface.

8. The bait station of claim 7, wherein the lid is integrally hinged to the base.

9. The bait station of claim 7, wherein the bait station includes a bait chamber defined at least in part by walls that extend vertically from the base.

10. The bait station of claim 7, wherein the base includes a second doorway that leads to the interior.

11. The bait station of claim 10, wherein the lid is integrally hinged to the base.

12. The bait station of claim 11, wherein the bait station includes a bait chamber defined at least in part by walls that extend vertically from the base.

13. The bait station of claim 12, further comprising bait designed to kill rodents, the bait being positioned in the interior.

14. The bait station of claim 7, further comprising bait designed to kill rodents, the bait being positioned in the interior.

15. A bait station comprising:
   a lid coupled to a base, the base and lid defining an interior when the lid is closed, the base having a doorway that leads to the interior, the base also having a bottom in which one or more openings are positioned;
   an empty receptacle securable to the base such that a portion of the receptacle is underneath the bottom of the base of the bait station, the receptacle having one or more protrusions extendable through the one or more openings in the bottom of the base, the receptacle also being sized to hold, and having an opening through which weighted material as large as a patio block can be inserted into or removed from the receptacle without screwing or unscrewing a fastener, and such that when the weighted material is disposed in the receptacle a portion of the weighted material is underneath the bottom of the base of the bait station and no portion of the weighted material is below the receptacle; and
   wherein when the receptacle is on a surface with the weighted material disposed in the receptacle the portion of the receptacle is underneath the portion of the weighted material and above the surface.

16. The bait station of claim 15, wherein the lid is integrally hinged to the base.

17. The bait station of claim 15, wherein the bait station includes a bait chamber defined at least in part by walls that extend vertically from the base.

18. The bait station of claim 15, wherein the base has a height and a front-to-back width that is greater than the height.

19. The bait station of claim 15, wherein the base includes a second doorway that leads to the interior.

20. The bait station of claim 19, wherein the lid is integrally hinged to the base.

21. The bait station of claim 20, wherein the bait station includes a bait chamber defined at least in part by walls that extend vertically from the base.

22. The bait station of claim 21, further comprising bait designed to kill rodents, the bait being positioned in the interior.

23. The bait station of claim 15, further comprising bait designed to kill rodents, the bait being positioned in the interior.

24. A bait station comprising:
   a lid coupled to a base, the base and lid defining an interior when the lid is closed, the base having a doorway that leads to the interior, the base also having a bottom; and
   an empty receptacle securable to the base such that a portion of the receptacle is underneath the bottom of the base of the bait station, the receptacle having one or more openings, the receptacle also being sized to hold, and having an other opening through which weighted material as large as a patio block can be inserted into or removed from the receptacle without screwing or unscrewing a fastener, and such that when the weighted material is disposed in the receptacle a portion of the weighted material is underneath the bottom of the base of the bait station and no portion of the weighted material is below the receptacle;

wherein the base of the bait station has one or more protrusions extendable through the one or more openings in the receptacle;

wherein when the receptacle is on a surface with the weighted material disposed in the receptacle the portion of the receptacle is underneath the portion of the weighted material and above the surface.

25. The bait station of claim 24, wherein the lid is integrally hinged to the base.

26. The bait station of claim 24, wherein the bait station includes a bait chamber defined at least in part by walls that extend vertically from the base.

27. The bait station of claim 24, wherein the base has a height and a front-to-back width that is greater than the height.

28. The bait station of claim 24, wherein the base includes a second doorway that leads to the interior.

29. The bait station of claim 28, wherein the lid is integrally hinged to the base.

30. The bait station of claim 29, wherein the bait station includes a bait chamber defined at least in part by walls that extend vertically from the base.

31. The bait station of claim 30, further comprising bait designed to kill rodents, the bait being positioned in the interior.

32. The bait station of claim 24, further comprising bait designed to kill rodents, the bait being positioned in the interior.

33. A bait station comprising:
a lid coupled to a base, the base and lid defining an interior when the lid is closed, the base having a doorway that leads to the interior, the base also having a bottom in which one or more openings are positioned;
a receptacle securable to the base such that a portion of the receptacle is underneath the bottom of the base of the bait station, the receptacle having one or more protrusions extending through the one or more openings in the bottom of the base, the receptacle also being sized to hold, and having an opening through which weighted material as large as a patio block can be inserted into or removed from the receptacle without screwing or unscrewing a fastener; and
weighted material positioned in the receptacle such that the weighted material is underneath the bottom of the base of the bait station and no portion of the weighted material is below the receptacle;
wherein when the receptacle is on a surface the portion of the receptacle is underneath the weighted material and above the surface.

34. The bait station of claim 33, wherein the lid is integrally hinged to the base.

35. The bait station of claim 33, wherein the bait station includes a bait chamber defined at least in part by walls that extend vertically from the base.

36. The bait station of claim 33, wherein the base has a height and a front-to-back width that is greater than the height.

37. The bait station of claim 33, wherein the base includes a second doorway that leads to the interior.

38. The bait station of claim 37, wherein the lid is integrally hinged to the base.

39. The bait station of claim 38, wherein the bait station includes a bait chamber defined at least in part by walls that extend vertically from the base.

40. The bait station of claim 39, further comprising bait designed to kill rodents, the bait being positioned in the interior.

41. The bait station of claim 33, further comprising bait designed to kill rodents, the bait being positioned in the interior.

42. A bait station comprising:
a lid coupled to a base, the base and lid defining an interior when the lid is closed, the base having a doorway that leads to the interior, the base also having a bottom;
a receptacle secured to the base such that a portion of the receptacle is underneath the bottom of the base of the bait station, the receptacle having one or more openings, the receptacle also being sized to hold, and having another opening through which weighted material as large as a patio block can be inserted into or removed from the receptacle without screwing or unscrewing a fastener; and
weighted material positioned in the receptacle and no portion of the weighted material is below the receptacle;
wherein the base of the bait station has one or more protrusions extending through the one or more openings in the receptacle;
wherein when the receptacle is on a surface the portion of the receptacle is underneath the weighted material and above the surface.

43. The bait station of claim 42, wherein the lid is integrally hinged to the base.

44. The bait station of claim 42, wherein the bait station includes a bait chamber defined at least in part by walls that extend vertically from the base.

45. The bait station of claim 42, wherein the base has a height and a front-to-back width that is greater than the height.

46. The bait station of claim 42, wherein the base includes a second doorway that leads to the interior.

47. The bait station of claim 46, wherein the lid is integrally hinged to the base.

48. The bait station of claim 47, wherein the bait station includes a bait chamber defined at least in part by walls that extend vertically from the base.

49. The bait station of claim 48, further comprising bait designed to kill rodents, the bait being positioned in the interior.

50. The bait station of claim 42, further comprising bait designed to kill rodents, the bait being positioned in the interior.

* * * * *